United States Patent
Taraki et al.

(10) Patent No.: US 6,532,001 B1
(45) Date of Patent: *Mar. 11, 2003

(54) MOUSE CONTROL FOR SCROLLING SWITCH OPTIONS THROUGH SCREEN ICON FOR THE SWITCH

(75) Inventors: Yosuf M. Taraki, Evanston; Dale A. Trsar, Mt. Prospect; Tyrone J. Moritz, Morton Grove; Richard H. Shepherd, McHenry; Mark H. Petersen, Mundelein, all of IL (US)

(73) Assignee: Snap-On Technologies, Inc., Crystal Lake, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 901 days.

(21) Appl. No.: 08/628,995

(22) Filed: Apr. 10, 1996

(51) Int. Cl.[7] .................................................. G09G 5/08
(52) U.S. Cl. ...................................... 345/163; 345/157
(58) Field of Search ................................. 345/156, 157, 345/163, 112, 145; 395/326, 333

(56) References Cited

U.S. PATENT DOCUMENTS

| 4,698,624 A | * | 10/1987 | Barker et al. | 345/123 |
|---|---|---|---|---|
| 4,734,689 A | | 3/1988 | Kurakake | 345/123 |
| 4,739,314 A | * | 4/1988 | McCaskill et al. | 345/144 |
| 5,039,937 A | * | 8/1991 | Mandt et al. | 395/973 |
| 5,278,508 A | | 1/1994 | Bowman | 324/384 |
| 5,398,044 A | | 3/1995 | Hill | 345/145 |
| 5,418,549 A | * | 5/1995 | Anderson et al. | 395/973 |

OTHER PUBLICATIONS

Robert Cowart, Mastering Windows 3.1, 1993, p. 178.*

* cited by examiner

Primary Examiner—Richard Hjerpe
Assistant Examiner—R. Laneau
(74) Attorney, Agent, or Firm—McDermott, Will & Emery

(57) ABSTRACT

A display control apparatus includes a display screen and a mouse and a processor coupled to the screen and mouse for displaying a mouse cursor and icons graphically representing switches, with each switch having assigned thereto a circular list of indicia respectively representing different switch options. If the mouse button is clicked on an icon the switch associated with the icon is activated and if the mouse button is held down while the cursor is on an activated icon the list of indicia assigned to the icon switch is scrolled through the icon while the cursor remains trapped in the icon. The display screen is incorporated in an engine analyzer which stores frames of digitized waveform data, the screen having a frame icon which indicates number in a decimal number, the number of the frame being displayed. When the cursor button is held down while the cursor is on the frame icon, vertical movements of the mouse will scroll the whole or integer part of the frame number through the icon window, i.e., the digits to the left of the decimal point will be scrolled, and when the mouse is moved horizontally, the numbers to the right of the decimal point will be scrolled to display portions of two consecutive frames, thereby effectively shifting on the screen the position of the beginning of the frame.

15 Claims, 7 Drawing Sheets

MOUSE CONTROL FOR SCROLLING SWITCH OPTIONS THROUGH SCREEN ICON FOR THE SWITCH

BACKGROUND OF THE INVENTION

1. Field of the Invention

The present invention relates to screen displays with mouse interfaces and, in particular, to means for processing mouse control operations for controlling screen display features. The invention has particular application to screen displays in digital engine analyzers.

2. Description of the Prior Art

Digital storage oscilloscopes are well-known and typically have two modes of operation, viz., live and freeze. In the live mode, one or more selected input signals are repeatedly sampled by a data acquisition system and the resulting digitized waveform data is displayed on the screen of the oscilloscope and saved in memory. When the freeze mode is activated, data acquisition is suspended and the most recently-displayed section of waveform data remains "frozen" on the screen. At this point the operator can review previously acquired waveform data that has been saved in memory by recalling it from memory and displaying it on the screen.

It is also known to provide engine analyzers with display screens which essentially constitute digital oscilloscopes. Such analyzers acquire for storage and display waveforms generated by associated multi-cylinder internal combustion engines.

The horizontal scale (also called sweep) of an oscilloscope's screen represents time. Broadly speaking, in a digital engine analyzer scope there are two types of sweeps: engine sweeps and fixed-time sweeps. Engine sweeps display waveform for either a single cylinder ignition or for a complete engine cycle (the time between consecutive firings of the same cylinder), and are typically used to display waveforms related to cylinder ignition events. Fixed-time sweeps (e.g., 10 ms, 100 ms, etc.) display a fixed period of time across the width of the display screen, and are typically used to display waveforms other than primary and secondary ignition waveforms.

It is known in prior digital engine analyzers to operate the analyzer in either ignition scope mode or a standard lab scope mode. The ignition scope mode is normally used for analyzing primary and secondary ignition waveforms. The lab scope mode is typically used for analyzing waveforms other than primary and secondary ignition waveforms, the display of which other waveforms utilizes a fixed-time sweep.

Prior engine analyzers are typically provided with a user interface, which may include a keyboard, light pen, mouse or the like. In connection with such user interfaces, the analyzer may be provided with an operating program which may display one or more icons on the screen, each of which graphically represents an associated switch which can be manipulated with the keyboard or the mouse. One type of icon is in the nature of a rectangular box or window, and the switch associated with that box is assigned a list of a finite set of options, each of which may have a corresponding indicium displayable within the box. The switch can assume only one of these options at any given time.

In prior systems, such an icon switch is commonly manipulated with a mouse by simply clicking the mouse on the icon, i.e., placing the mouse cursor on the icon and momentarily depressing one of the mouse control buttons. Each "click" of the button will step the switch forward one option and change the display in the icon box or window to the next indicium on the list of indicia. This technique is effective, but it is slow. The user can index through the list of options in only one direction and, therefore, if there is a large number of options in the list, a large number of mouse clicks may be required to get to the option of interest.

In another prior art technique for manipulating an icon switch with a mouse, when the icon is activated a pop-up menu appears on the screen listing switch options which can be selected by clicking the mouse on a particular option. But this technique in addition to requiring additional mouse movements may additionally require scrolling of the list to view the entire list. Furthermore, the menu obscures part of the screen and the response to a menu selection cannot be seen until the menu is exited.

SUMMARY OF THE INVENTION

It is a general object of the invention to provide an improved apparatus for controlling a display screen with the use of a mouse, which apparatus avoids the disadvantages of prior apparatuses while affording additional structural and operating advantages.

An important feature of the invention is the provision of a mouse-controlled display apparatus wherein X-Y movements of the mouse do not affect cursor position on the screen but, rather, affect some other screen display feature.

In connection with the foregoing feature, a further feature of the invention is the provision of an apparatus of the type set forth, wherein X-Y mouse movements can be used to control the scrolling of a list of switch options displayable in a fixed-position screen icon.

In connection with the foregoing features, another feature of the invention is a provision of an apparatus of the type set forth, wherein the mouse can be used with an icon which represents two switches, with vertical and horizontal mouse movements respectfully controlling different lists of options respectively associated with the two switches.

In connection with the foregoing feature, yet another feature of the invention is the provision of an apparatus of the type set forth, wherein vertical movements of the mouse control selection among different frames of waveform data for display on the screen, while horizontal movements of the mouse control the position of the waveform data on the screen.

Certain features of the invention are attained by providing display control apparatus comprising a display screen, a mouse having an X-Y motion sensor and control buttons, and a processor coupled to the display screen and to the mouse and operable under stored program control for controlling the display screen to display thereon indicia including a cursor associated with the mouse, the processor including means cooperating with the mouse to define first and second operational modes for the mouse wherein in the first mode the processor is responsive to movements of the mouse detected by the X-Y motion sensor for effecting corresponding movements of the cursor on the screen and wherein in the second mode the processor is responsive to movements of the mouse detected by the X-Y motion sensor while the cursor is on another indicium to control the condition of the other indicium without affecting the location on the screen of either the cursor or the other indicium.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
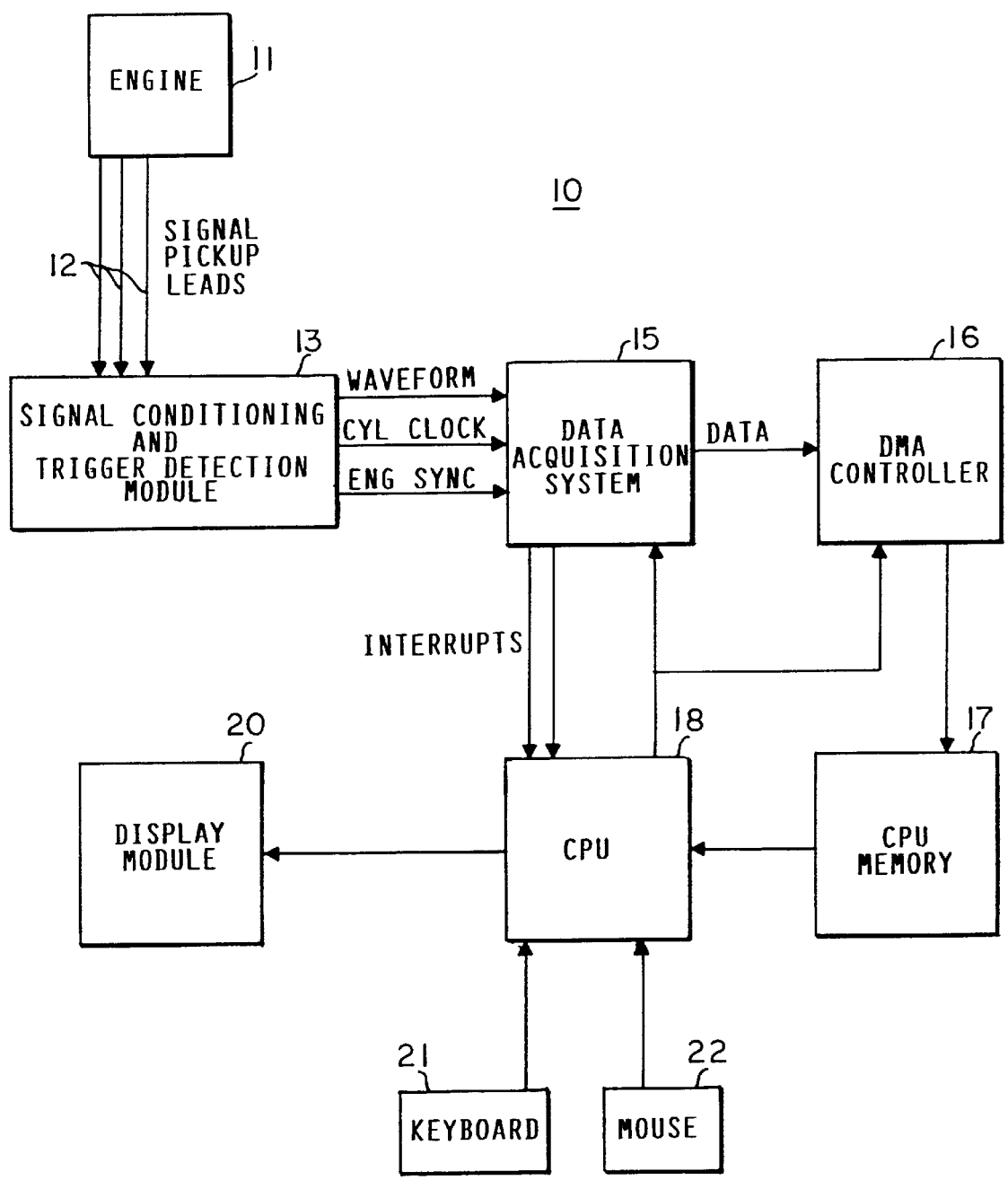
FIG. 1 is a functional block diagram of an engine analyzer system incorporating a digital oscilloscope display with a mouse interface in accordance with the present invention.

Referring to FIG. 1, there is illustrated an engine analyzer, generally designated by the numeral 10, in accordance with the present invention. The engine analyzer 10 is adapted for analyzing the operation of an associated multi-cylinder internal combustion engine 11 by, inter alia, monitoring analog waveform signals generated by the engine 11. In this regard, the analyzer 10 is provided with a plurality of signal pickup leads 12 adapted for connection to selected points in the engine 11 for acquiring input signals therefrom. While three such leads have been shown in FIG. 2, this is simply for purposes of illustration, and it will be appreciated that a larger number of leads may be provided. These leads may include general-purpose voltage pickup probes, which will hereinafter be referred to as "pinpoint" leads.

The signal pickup leads 12 are coupled to a signal conditioning and trigger detection module 13, which performs pre-conditioning operations on the input waveform signals and passes the waveform signals to a data acquisition system 15. The signal conditioning and trigger detection module 13 also generates two digital signals, a cylinder clock signal indicating the firing of each cylinder, and an engine sync signal indicative of the firing of the no. 1 cylinder, which latter signals are also supplied to the data acquisition system 15, which digitizes the analog input waveform signals to produce digitized waveform data. The digitized waveform data is passed to a direct memory access (DMA) controller 16, which controls its storage in a CPU memory 17.

The analyzer 10 includes a central processing unit (CPU) 18 which is coupled to each of the data acquisition system 15, the DMA controller 16 and the memory 17, as well as to a display module 20. The CPU 18 controls the operation of the data acquisition system 15 and the DMA controller 16 and also receives interrupts from the data acquisition system 15, which interrupts may be responsive, inter alia, to the cylinder clock signals. The CPU 18 also controls transfer of stored waveform data from the memory 17 to the display module 20, and also controls the various operational modes of the display module 20. In this regard, the display module 20 is preferably a color oscilloscope display and is operable in live and freeze modes and in single-trace and dual-trace modes, with various sweeps and with various types of triggering. User selection of these and other parameters is effected through an appropriate user interface, which may include a keyboard 21 and/or a mouse 22, which are coupled to the CPU 18.

The display module 20 is provided with a plurality of different fixed-time sweeps and the usual cylinder, parade and raster engine sweeps. The digital waveform data in the analyzer 10 is managed and stored in the memory 17 by frames wherein, in the case of a fixed-time sweep, a frame is the waveform data for the time period across the width of the display screen.

Figure 2:
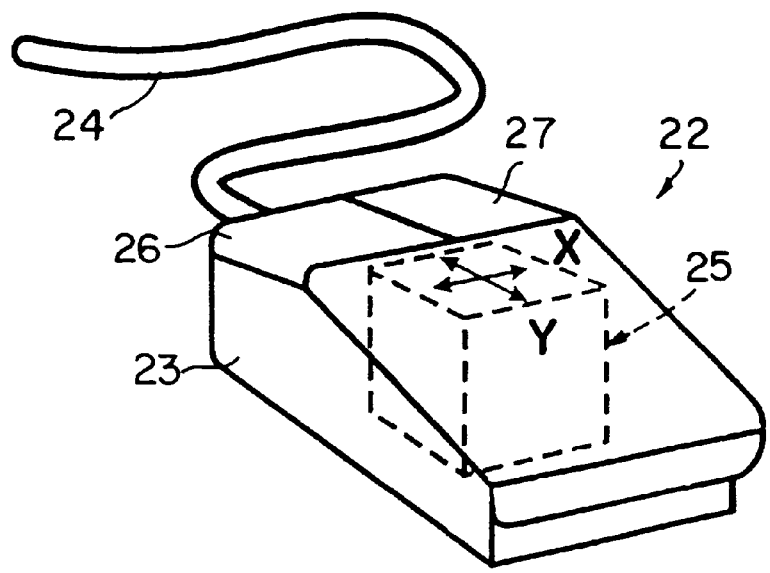
FIG. 2 is a perspective view of the mouse of the system of FIG. 1.

Referring also to FIG. 2, the mouse 22 has a housing 23 provided with a cable 24 adapted for coupling to the CPU 18. Mounted in the housing 23 is an X-Y sensor 25 for detecting horizontal and vertical sliding movements of the mouse 22 along an underlying support surface, such as a mouse pad, in a known manner. (As used herein the terms "horizontal" and "vertical", respectively, refer to the X and Y directions in a two-dimensional grid.) The mouse 22 is also provided with control buttons, two such button 26 and 27 being illustrated in FIG. 2, although it will be appreciated that other numbers of buttons may be provided.

Figure 3:
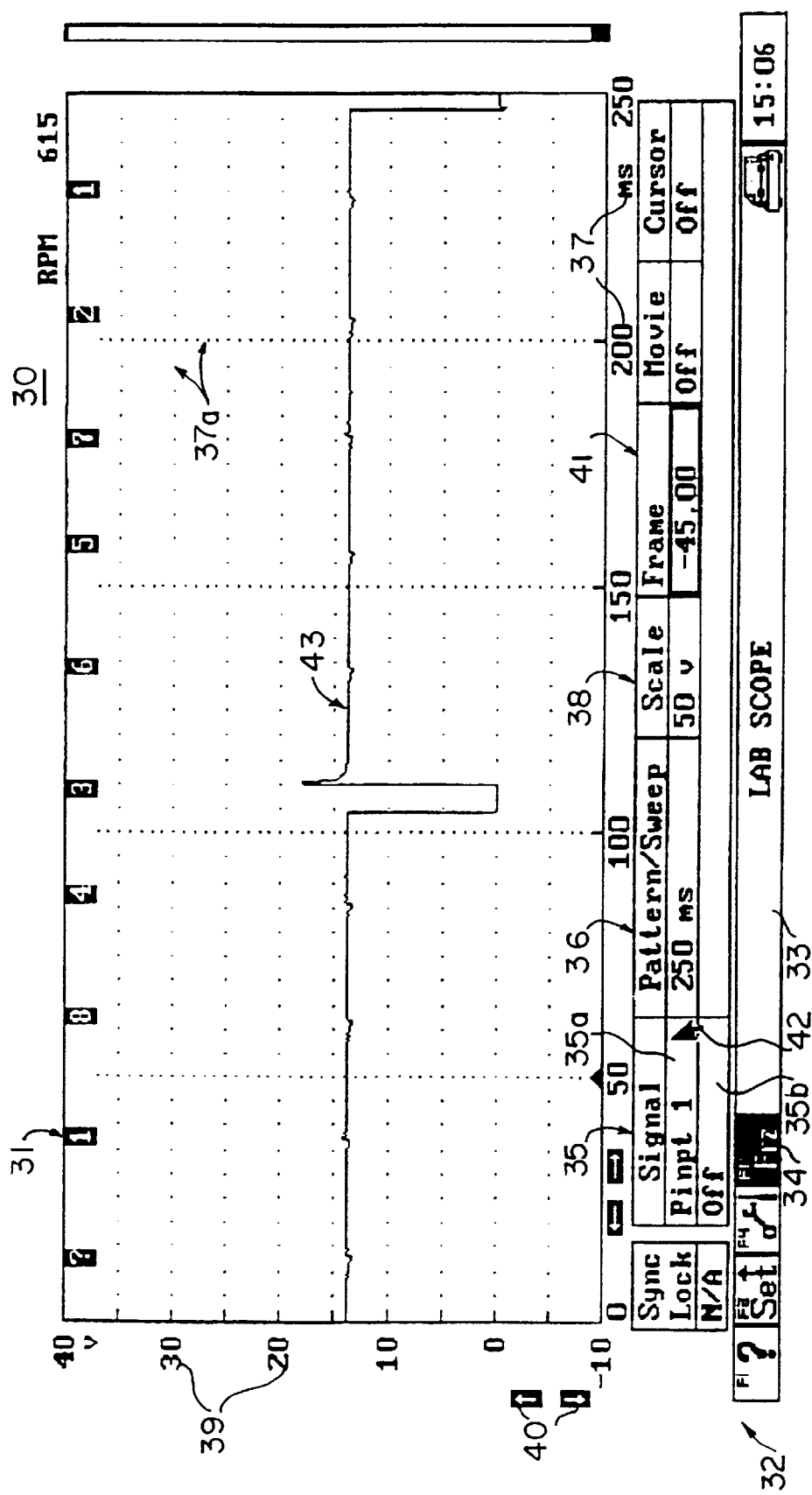
FIG. 3 is a screen display obtainable with the system of FIG. 1, displaying a first set of waveform data.

Referring now to FIG. 3, there is illustrated a screen display 30 which is one of a number of screen displays available with the engine analyzer 10, and which will be useful for explaining significant aspects of the invention. The screen display 30 is set up in a single-trace display mode, so that it has a single rectangular waveform plot area 31 for displaying a waveform, such as a waveform 43, along a horizontal axis or trace. Displayed below the waveform plot area 31 is a control panel area 32, including a number of icons and indicators in the nature of rectangular boxes in which text or other indicia may be displayed, the boxes being arranged in horizontal rows.

In the lowermost row is a scope mode indicator 33, which indicates the selected scope mode. In this case, the indicated mode is "Lab Scope", which is typically used for displaying signals other than primary and secondary ignition signals.

There is also provided a Freeze icon 34 which, when highlighted (colors changed) as in FIG. 3, selects the Freeze display mode. When this icon is not highlighted, the display is in live mode.

The control panel area 32 also includes a Signal icon 35, which includes boxes 35a and 35b respectively indicating the signals displayed in the two traces of the dual-trace display scope when it is in dual-scope mode. In each of these boxes, the user can select from a plurality of different signal options, with different options respectively corresponding to different ones of the signal pickup leads 12. In this case, the signal displayed on the first trace is the signal appearing on the "Pinpoint 1" lead. For the box 35b, one of the available options is "OFF". When this option is selected, as in FIG. 3, the second trace is OFF, so that the scope is operating in single-trace mode.

There is also a Pattern/Sweep icon 36 which indicates the selected sweep, in this case a 250 ms fixed-time sweep. In Lab Scope mode, as in FIG. 3, the display module 20 always uses a fixed-time sweep. Time indicia 37 indicating the sweep time scale are displayed across the bottom of the waveform area 31 in 50 ms increments.

There is also provided a Scale icon 38 which indicates the scale of the plot area 31 along the vertical axis. In this case, a 50-volt scale has been selected. Accordingly, scale indicia 39 are arranged in 10-volt increments along the left-hand side of the waveform plot area 31. In this case, it will be noted that the zero level of the scale is set so that the scale goes from −10 volts to +40 volts. The location of this zero level can be selectively changed by the use of control arrows 40. In FIG. 3 horizontal and vertical dotted grid lines 37a are also optionally displayed to facilitate measuring the waveform 43 relative to the sweep time and voltage sale indicia.

There is also provided a Frame select icon 41 which is used to select the frame of waveform data currently displayed on the screen. FIG. 3 indicates that frame −45.00 is currently being displayed. For fixed-time sweeps, as in FIG. 3, a frame represents the waveform for a period of time corresponding to a single screen width, i.e., 250 ms in this case. When the freeze mode is activated integer frame numbers are assigned to all saved data frames. Zero is assigned to the most recently displayed frame, preceding frames being assigned incrementally larger negative numbers.

There is associated with the mouse 22 a cursor 42 which is displayed on the screen display 30 in the form of an arrow head in a known manner.

As can be seen in FIG. 3, the screen display 30 includes other icons, indicators and other types of indicia which are not described herein, since they are not pertinent to the present invention.

Each of the icons in the screen display 30 represents a switch which can be controlled by the keyboard 21 and/or the mouse 22. In particular, each of the icons 35, 36, 38 and 41 has associated with it a list of a plurality of switch options. Each switch can assume only one of these options at a given time. There is an indicium associated with each switch option. The icon box may be considered to be a "window" in which is displayed the indicium corresponding to the currently-selected switch option. The user can scroll through the list of switch options for each switch by use of either the keyboard or the mouse. It is a significant aspect of the present invention that the mouse can be used to scroll through a list of switch options in two distinct modes: (a) a click index mode wherein each click of the mouse button can index forwardly one step in the list, and (b) a scroll mode wherein the mouse button can be held down while the user scrolls rapidly either forwardly or rearwardly through the list by moving the mouse, as will be explained in greater detail below.

The Frame select icon 41 is different from the other icons in that it effectively represents two switches, each of which has associated with it a circular list of switch options, each with a corresponding indicium. For all of the icons, each indicium for a switch option constitutes a character group. In the case of the Frame select icon 41, the character group may be viewed as a two-part character group.

Figure 5:
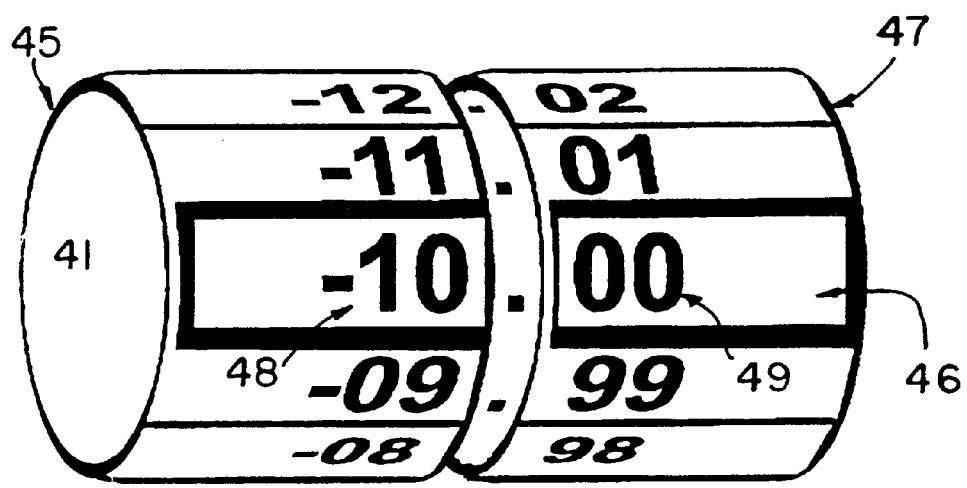
FIG. 5 is diagrammatic illustration of the lists of switch option indicia associated with Frame select icon of the screen display of FIG. 4.

Referring to FIG. 5, there are illustrated two imaginary cylinders arranged end-to-end and respectively bearing on the surfaces thereof the circular lists 45 and 47 of indicia for the two switches associated with the Frame select icon 41. In FIG. 5, the number 41 designates the "window" corresponding to the icon box in which a character group 46 designating the selected frame of waveform data is displayed. The character group 46 in this case is a decimal number including an integral number part 48 before the decimal point which may have 1 to 3 digits and a fractional number part 49 after the decimal point which has two digits. Thus, there are associated with the two switches represented by the icon 41 two lists of indicia, a list 45 including the indicia comprising the integral number parts of 48 of the frame numbers, and a list 47 comprising fractional number parts 49 of the frame numbers. It is a significant aspect of the present invention that these two parts of the frame number can be independently controlled by the mouse 22.

Figure 4:
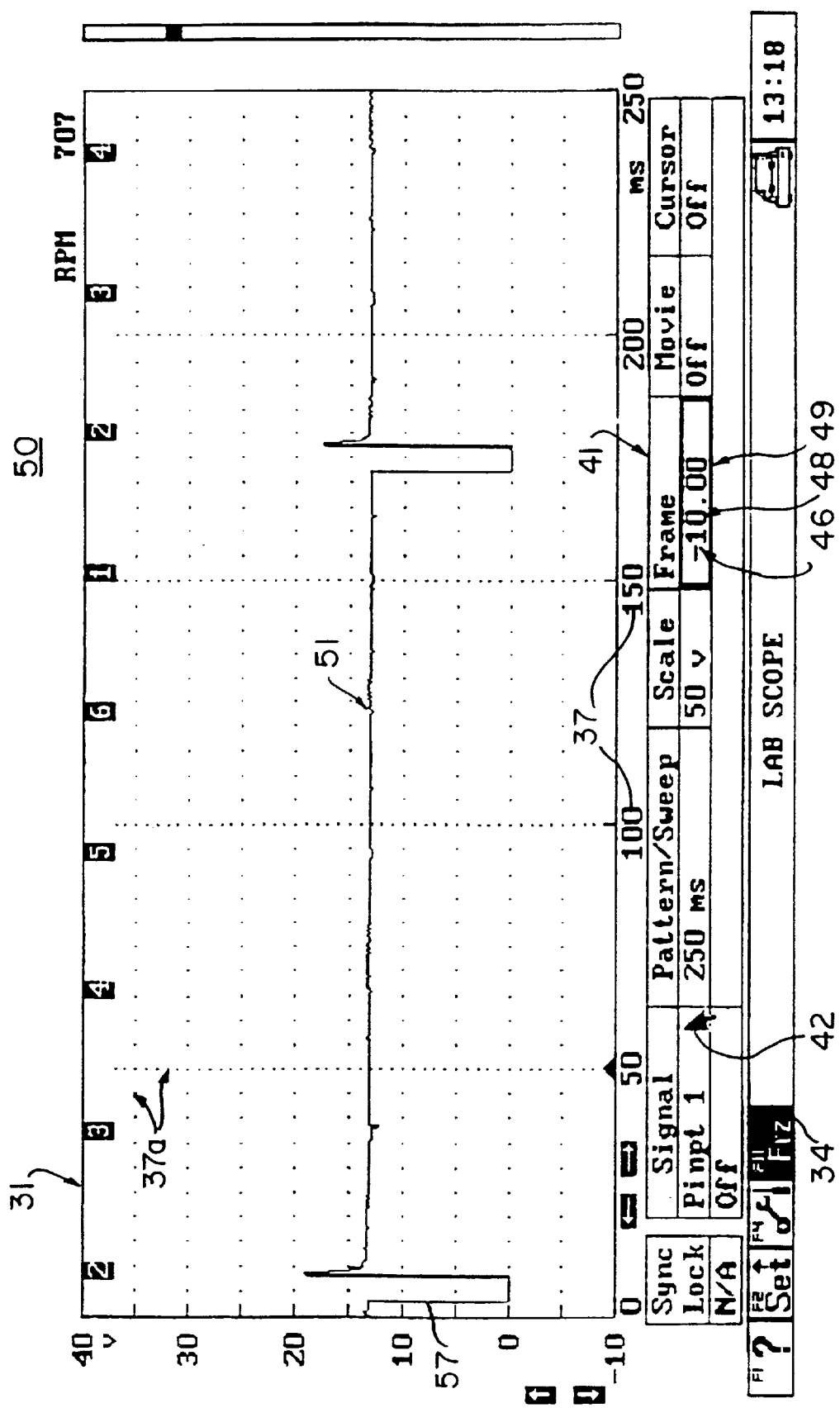
FIG. 4 is another screen display obtainable with the system of FIG. 1, displaying another set of waveform data.
Figure 6:
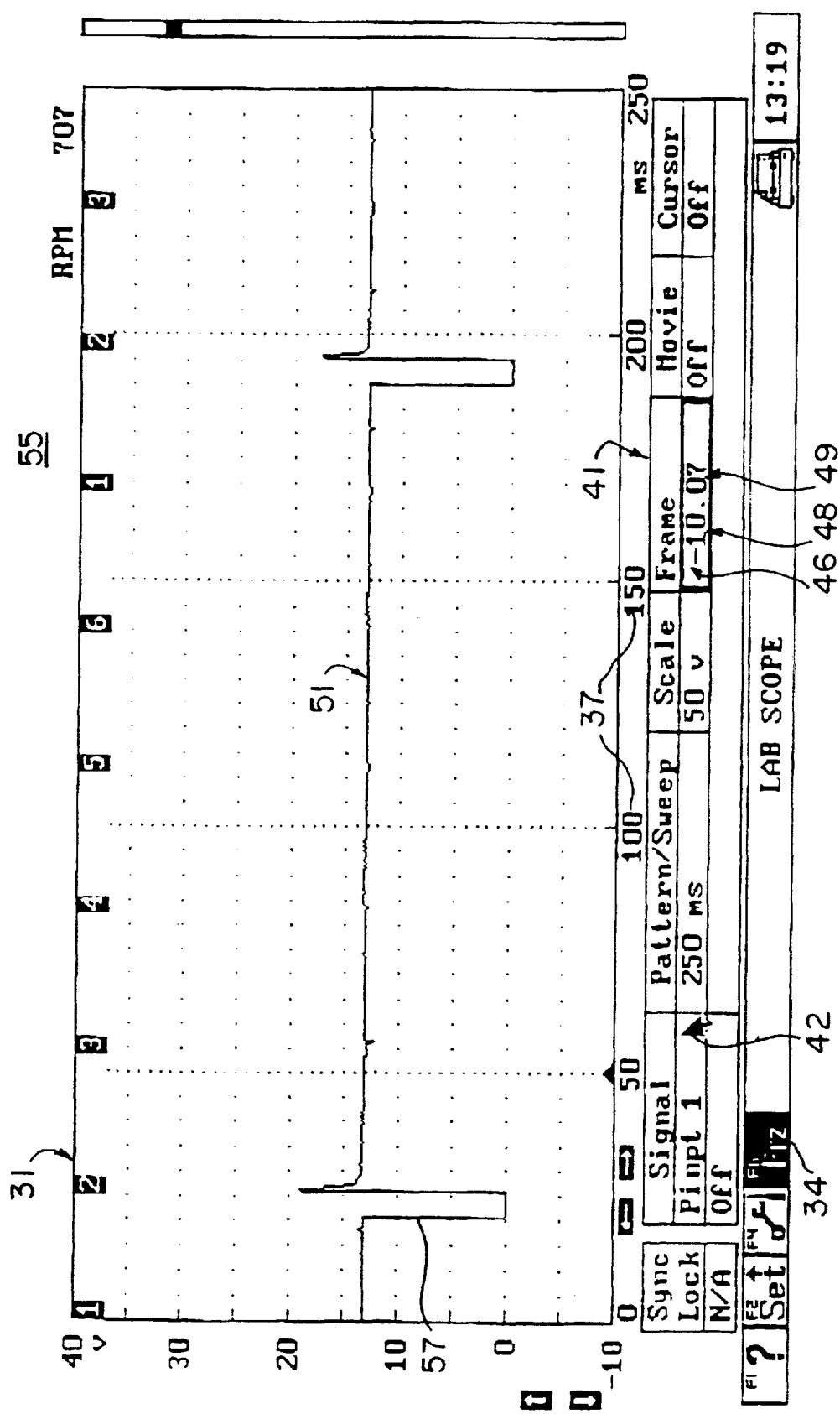
FIG. 6 is a screen similar to FIG. 4, illustrating a different position of the waveform data.

As can be seen in FIG. 3, the waveform 43 is made up of the digitized waveform data in frame −45.00, as is indicated in the Frame select icon 41. In FIG. 4 there is illustrated a similar screen display 50 in which a waveform 51 of the same signal is displayed but, in this case, the display is made up of the digitized waveform data in frame −10.00, as is indicated in the Frame select icon 41. In FIG. 6 there is illustrated a similar screen display 55, except that in this case the waveform display constitutes data from frame −10.07. This means that the waveform 51 of FIG. 4 has essentially been shifted to the right on the waveform plot area 31, so that 0.07 of frame −10 has disappeared from the right-hand side of the screen, and 0.07 of the preceding frame (−11) appears at the left-hand side of the screen. It can be seen from a comparison of FIGS. 4 and 6 that the waveform 51 has been shifted 0.07 of a screen width, i.e., 35 ms, to the right in FIG. 6. This can be readily seen by comparing the positions of the leading edge 57 of the pulse in the waveform 51 in FIGS. 4 and 6.

It is a significant aspect of the invention that, for this dual-switch icon 41, the list of switch options for the first switch, i.e., the integral number part 48 of the frame number, is scrolled by vertical movements of the mouse 22, while the list of options for the other switch, corresponding to the fractional number part 49 of the frame number, is scrolled by horizontal movements of the mouse 22. Thus, the user can scroll from the frame 45 of FIG. 3 to frame −10 of FIG. 4 by substantially vertical movement of the mouse 22, and can scroll from the frame −10.00 of FIG. 4 to the frame −10.07 of FIG. 6 by substantially horizontal movement of the mouse 22. It will be appreciated that, as the integral frame numbers change, different waveforms appear on the screen and as the fractional part of the frame number changes the waveform is scrolled horizontally across the screen.

In order to manipulate one of the icon switches represented by the icons 35, 36, 38 and 41 the icon must first be designated as currently active, rendering active the switch or switches represented by the icon. Only one icon is active at a given time. The active icon is indicated by emphasizing it, i.e., by an intensified border drawn around the icon box. For example, in FIG. 3 the box for the Frame select icon 41 is emphasized, indicating that it is active. A non-active icon is activated with the mouse 22 by placing the mouse cursor 42 on the icon and depressing the left mouse button 26. Once the icon is active, clicking the mouse button 26 will incrementally index the list of options in the forward direction, with one step or switch option for each click of the mouse 22. (In the case of the Frame select icon 41, only the integral number part 48 of the frame number can be click indexed in this manner.)

In accordance with the present invention there is another method for faster, bi-directional scrolling through the list of options. If the mouse cursor 42 is placed on an icon and the left mouse button 26 is held down longer than a predetermined time, the icon is emphasized and its switch or switches will enter a Scroll mode. In Scroll mode the currently selected option in the icon box is highlighted, i.e., displayed in reverse video and the mouse cursor 42 is trapped within the icon box. Then, moving the mouse 22 up or down in Scroll mode, with the left mouse button 26 held depressed, will cause the option list to scroll up or down accordingly. A mouse movement of Y-STEP is required to scroll one step, the value of Y-STEP depending on the mouse being used, but typically being approximately 1 mm. Since the mouse cursor 42 is trapped in the icon box, movement of the mouse 22 will not cause the mouse 42 cursor to move outside the box. When the left mouse button 26 is released, the Scroll mode is terminated and the switch selection is displayed in normal video and the mouse cursor 42 is untrapped.

If, in Scroll mode, the cursor 42 is on the Frame icon 41, (which appears only in Freeze mode) and a fixed-time sweep has been selected in the Pattern/Sweep icon 36 (as in FIGS. 4 and 6), then a horizontal Scroll mode is enabled for scrolling through the fractional part 49 of the frame number, as described above. This allows moving the displayed pattern 51 in increments of 1/100 of a screen width to scroll the waveform pattern horizontally across the waveform plot area 31.

Figure 7:
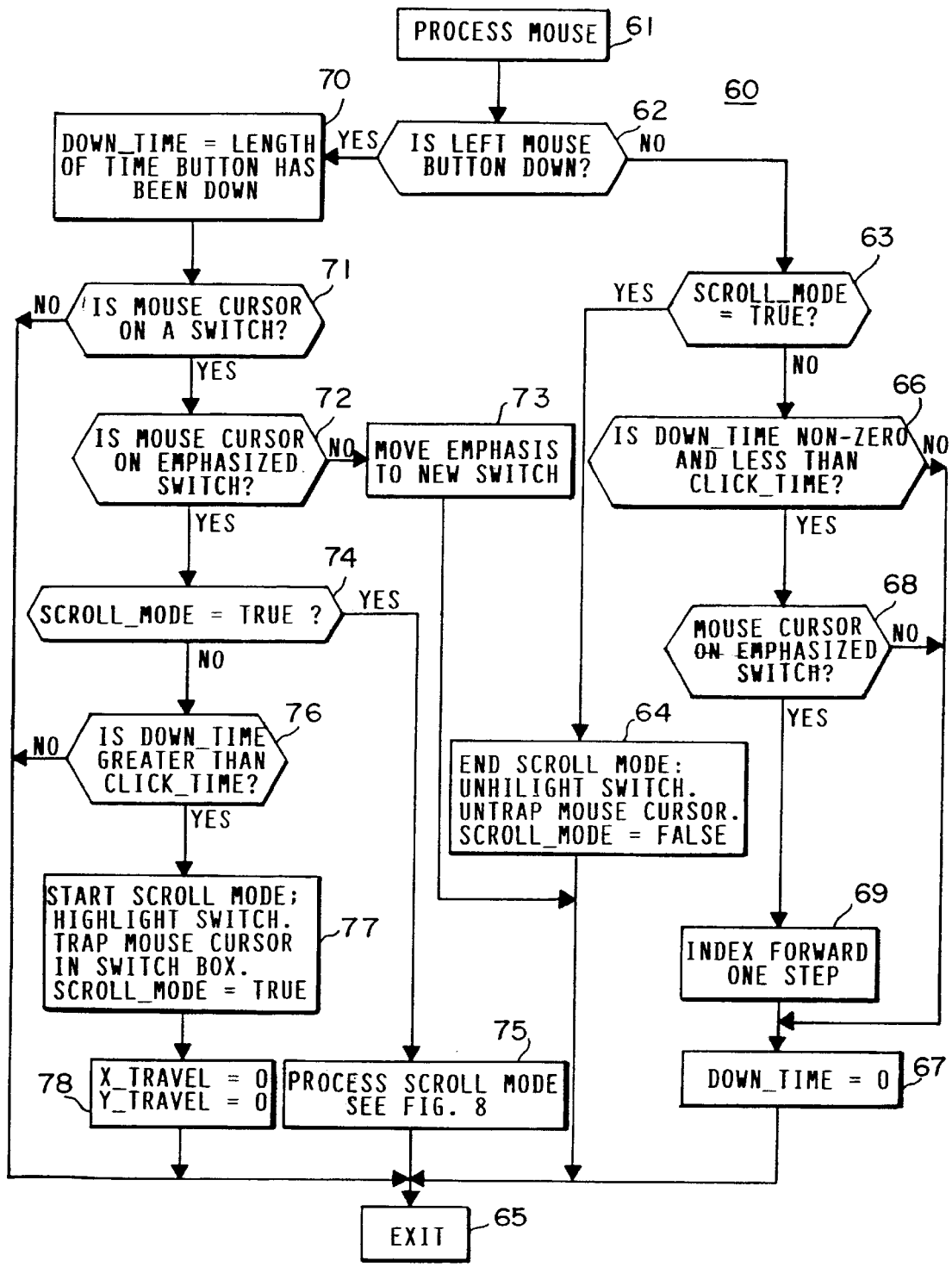
FIG. 7 is a flow chart diagram of a software program of the engine analyzer of FIG. 1 for processing the mouse functions.
Figure 8:
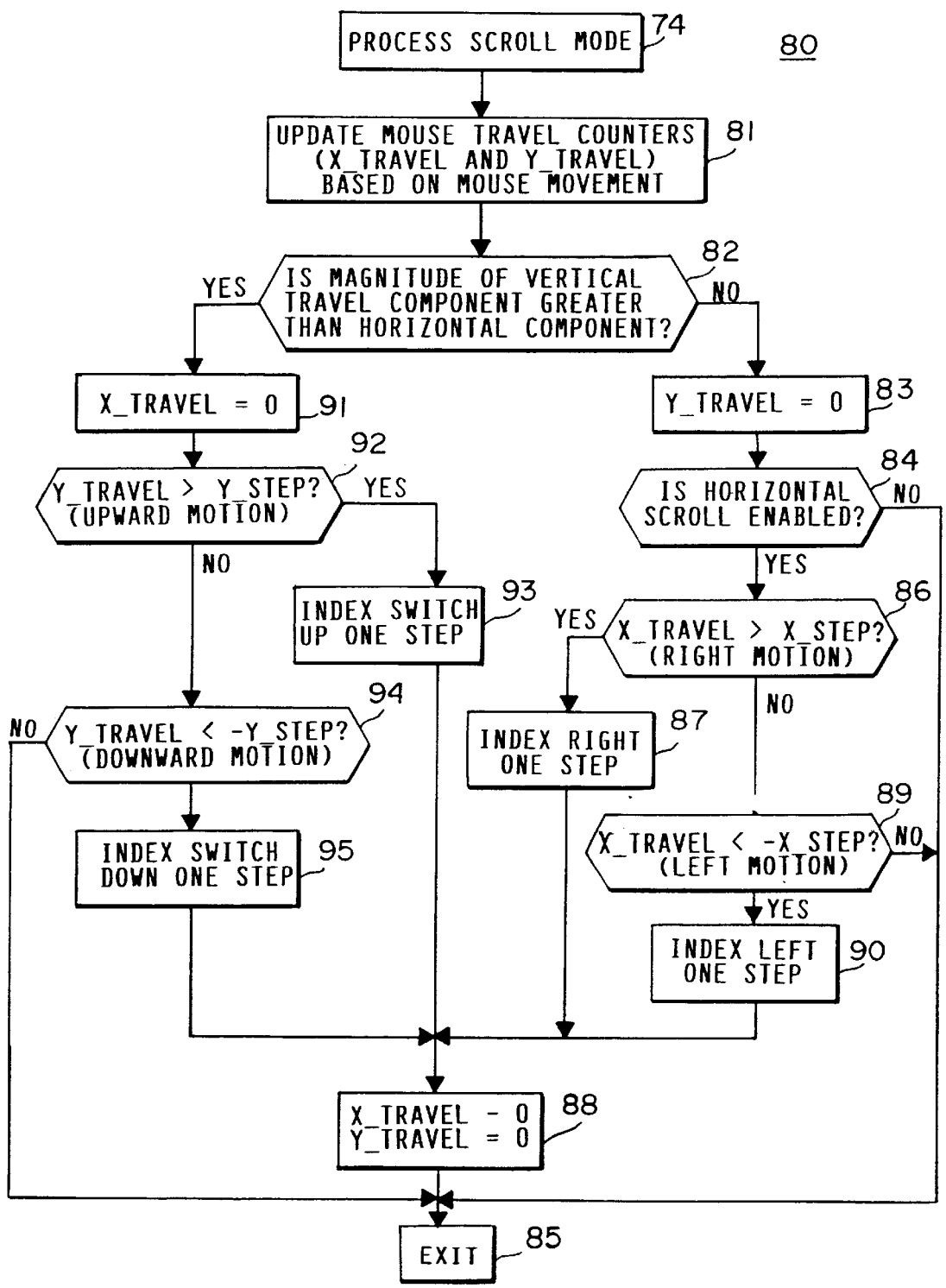
FIG. 8 is a flow chart diagram of a subroutine of the program of FIG. 7.

Referring now to FIGS. 7 and 8, the control of the screen display icons with the use of the mouse 22 will now be described in detail. FIG. 7 illustrates a flow diagram 60 for a program routine to process mouse functions. The routine is entered at 61, this routine being called or polled frequently and repeatedly by a main system program (not shown) in order to track the activities of the mouse 22. This routine 60 first checks at 62 to see if the left mouse button 26 is down. If it is not, the program checks at 63 to see if the Scroll mode is TRUE. If it is, the program at 64 terminates the Scroll mode by unhighlighting the switch indicium for the icon on which the mouse cursor 42 is positioned, untrapping the mouse cursor 42 and setting the Scroll mode to FALSE, and then exits the routine at 65. If, at 63, the Scroll mode is not TRUE, the program checks at 66 to see if the Down Time of the mouse button 26 is non-zero and is less than the CLICK TIME. CLICK TIME is the amount of time necessary to register a mouse button "click", typically approximately 100 ms. If the decision of 66 is "No" the program jumps to block 67 and sets to zero a value called "Down Time" (which corresponds to the length of time that the mouse button 26 has been depressed). If it is "Yes" it then next checks at 68 to see if the mouse cursor 42 is at an emphasized switch icon. If so, it indexes one step forward in the list of options associated with the emphasized icon at 69 and then moves to block 67. If the mouse cursor is not on an emphasized switch icon at 68, the program moves immediately to block 67.

If, at 62, the left mouse button 26 is down, the program, at 70, defines Down Time as equal to the length of time that the mouse button 26 has been down and then checks at 71 to see if the mouse cursor 42 is located on a switch icon. If it is not, the routine is immediately exited. If it is, the program checks at 72 to see if the mouse cursor is on an emphasized icon switch. If not, it moves the emphasis to the new switch at 73 and then exits. If, at 72, the mouse cursor is on an emphasized icon switch, the program next checks at 74 to see if the Scroll mode is TRUE. If it is, the program processes the Scroll mode at 75 by means of a subroutine which will be described in greater detail below in connection with FIG. 8. If the Scroll mode is not TRUE at 74, the program checks at 76 to see if Down Time is greater than CLICK TIME. If not, the routine is exited and if so, the program at 77 initiates the Scroll mode by highlighting the switch icon, trapping the cursor 42 in the icon box and setting the Scroll mode to TRUE. Then, at 78 the program sets each of the X and Y travel counters to zero and the routine is then exited at 65.

Referring to FIG. 8, there is illustrated a subroutine 80 for processing the Scroll mode, which is entered at 74 from the mouse processing routine 60 of FIG. 7. The routine first updates the mouse travel counters for X travel and Y travel based upon mouse movement. The program then checks at 82 to see if the magnitude of the vertical (Y travel) component is greater than the horizontal (X travel) component. If not, the mouse movement is not substantially vertical, so the program at 83 sets Y travel to zero and then checks at 84 to see of the horizontal Scroll is enabled. As was indicated above, it will be enabled if a fixed-time sweep has been selected on the Pattern/Sweep icon 36, the Freeze icon 34 is set to the FREEZE mode and the Frame select icon 41 is emphasized. If the horizontal Scroll is not enabled, the subroutine is immediately exited at 85. If the horizontal Scroll is enabled at 84, the program next checks at 86 to see if the X travel is greater than X-STEP, i.e., that a right-hand horizontal movement of one step has been detected. If so, the program at 87 idexes forward or right one step in the list of switch options associated with the fractional number part 49 of the frame number, i.e., 0.01 frame. The program then at 88 sets X travel and Y travel counters back to zero and exits. If sufficient right horizontal motion is not detected at 86, the program checks at 89 to see if X travel is less than –X-STEP, signifying a left-hand horizontal movement of one step. If not, the program is exited and if so, the program at 90 idexes backward one step in the fractional part 49 of the frame number and then moves to block 88.

If, at 82, the magnitude of the vertical travel component is greater than the horizontal component of mouse movement, this signifies vertical mouse travel and the program then at 91 sets X travel to zero and then checks at 92 to see if Y travel is greater than Y-STEP, signifying upward motion. If so, it indexes one step up or forward in the list of switch options at 93 and then moves to block 88. If upward movement is not detected at 92, the program checks at 94 to see if Y travel is less than –Y-STEP, signifying downward movement. If downward movement is not detected, the program is exited and, if it is, the program indexes one switch step down or backward at 95 and then moves to block 88.

As described above, the switches for the Frame select icon 41 which respectively correspond to the integral part and the fractional part of the frame number are scrolled independently of each other with the mouse. However, it will be appreciated that the scrolling of these two switches can be interrelated so that when the fractional part of the frame number indexes forwardly past 0.99 the integral part of the frame number will index to the next whole frame number. For example, in FIG. 4, if the mouse is moved horizontally to the right, the frame number will index from –10.99 to –11.00. Similarly, if the fractional part of the frame number is scrolled rearwardly past 0.00, the integral part of the frame number will index to the next preceding whole frame number. For example in FIG. 4, a leftward horizontal mouse movement in the Scroll mode would change the frame number from –10.00 to –9.99. Techniques for accomplishing this "wrapping" of the parts of decimal numbers are well known.

From the foregoing, it can be seen that there has been provided a unique mode of mouse control of icon switch options on a display screen, wherein the list can be scrolled through either forwardly or rearwardly by holding the mouse button down while moving the mouse, without affecting the position of the mouse cursor or the position of the icon on the screen. There has also been provided a technique for independently scrolling through two different sets of switch options associated with an icon by, respectively, vertical and horizontal movements of the mouse.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Display control apparatus comprising:

a display screen, a mouse having a X-Y motion sensor and control buttons, and operable under stored program control for controlling the display screen to display thereon indicia including a first indicium which is a cursor associated with the mouse, said processor including means cooperating with the mouse to define first and second operational modes for the mouse wherein in the first mode the processor is responsive to movements of the mouse detected by the X-Y motion sensor for effecting corresponding movements of the cursor anywhere on the screen and wherein in the second mode the processor is responsive to any movement of the mouse detected by the X-Y motion sensor in either of two opposite directions while the cursor is on a second indicium to control a condition of the second indicium without affecting the location on the screen of either the cursor or the second indicium, wherein said second indicium is a screen icon having graphical images displayed therein, and wherein the icon represents a switch and said processor includes means assigning to said switch a list of graphical images respectively representing different switch options with one image at a time being displayed in said icon, said processor in the second operational mode of the mouse being responsive to movements of the mouse detected by the X-Y motion sensor while the cursor is on the icon for scrolling through the list of images assigned to the icon.

2. The apparatus of claim 1, wherein the list forms a continuous loop.

3. Display control apparatus comprising:

a display screen, a mouse having a X-Y motion sensor and control buttons, and operable under stored program control for controlling the display screen to display thereon indicia including a first indicium which is a cursor associated with the mouse, said processor including means cooperating with the mouse to define first and second operational modes for the mouse wherein in the first mode the processor is responsive to movements of the mouse detected by the X-Y motion sensor for effecting corresponding movements of the cursor anywhere on the screen and wherein in the second mode the processor is responsive to any movement of the mouse detected by the X-Y motion sensor in either of two opposite directions while the cursor is on a second indicium to control a condition of the second indicium without affecting the location on the screen of either the cursor or the second indicium, wherein said second indicium is a screen icon having graphical images displayed therein, and wherein the icon represents two switches and said processor includes means assigning to each switch a list of graphical images respectively representing different switch options with one image at a time from each list being displayed in said icon, said processor in the second operational mode of the mouse being responsive to substantially vertical movements of the mouse detected by the X-Y motion sensor for scrolling through the list of character groups assigned to one of the switches and responsive to substantially horizontal movements of the mouse detected by the X-Y motion sensor for scrolling through the list of character groups assigned to the other switch.

4. Display control apparatus comprising:

a display screen, a mouse having an X-Y motion sensor and a control button, and a processor coupled to the display screen and to the mouse and operable under stored program control for controlling the display screen to display thereon a cursor associated with the mouse and icons graphically representing switches with each switch having assigned thereto a list of indicia respectively representing different switch options, said processor including means responsive to depression of the mouse control button while the cursor is on an icon for activating the icon and the switch represented by the icon, said processor including means responsive to depression of the mouse control button for more than a predetermined time while the cursor is on an icon for rendering the icon responsive to any movement of the mouse in either of two opposite directions detected by the X-Y motion sensor for scrolling through the list of indicia assigned to the activated switch.

5. The apparatus of claim 4, wherein said processor includes means responsive to activation of an icon to provide an indication on the screen that the switch is activated.

6. The apparatus of claim 4, wherein said processor includes means responsive to depression of the mouse control button for more than the predetermined time while the mouse cursor is on an icon for indicating on the screen that the switch represented by the icon is in a scrolling mode.

7. The apparatus of claim 4, wherein each icon describes a window on the screen within which is displayed a selected one of the indicia in the list associated with the switch represented by the icon.

8. The apparatus of claim 7, wherein said processor includes means responsive to depression of the mouse control button for more than the predetermined time while the mouse cursor is on an icon for trapping the cursor within the window defined by the icon.

9. The apparatus of claim 4, wherein said display screen includes a part of an engine analyzer for analyzing multi-cylinder internal combustion engines.

10. Display control apparatus comprising:

a display screen, a mouse having an X-Y motion sensor and a control button, and a processor coupled to the display screen and to the mouse and operable under stored program control for controlling the display screen to display thereon a cursor associated with the mouse and an icon graphically representing two switches with each switch having assigned thereto a list of indicia respectively representing different switch options, said processor including means responsive to depression of the mouse control button while the cursor is on the icon for activating the icon and the switches represented by the icon, said processor including means responsive to depression of the mouse control button for more than a predetermined time while the mouse cursor is on the icon for rendering the icon responsive to each substantially vertical up or down movement of the mouse detected by the X-Y motion sensor for scrolling through the list of indicia assigned to one of the switches and responsive to each substantially horizontal left or right movement of the mouse detected by the X-Y motion sensor for scrolling through the list of indicia associated with the other switch.

11. The apparatus of claim 10, wherein the selected indicia for the two switches are displayed side-by-side to form different parts of a two-part graphical image.

12. The apparatus of claim 11, wherein the image is a decimal number with the first part including digits before the decimal point and associated with one of the switches and with the second part including digits after the decimal point and associated with the other switch.

13. The apparatus of claim 10, wherein said processing means includes means for displaying on the screen a waveform associated with the icon, said processing means being responsive to scrolling of the list associated with one of the switches for correspondingly scrolling the waveform across the screen.

14. The apparatus of claim 10, wherein said display screen is part of an engine analyzer for analyzing waveforms from a multi-cylinder internal combustion engine.

15. The apparatus of claim 14, and further comprising memory means for storing numbered frames of digital waveform data displayed on the screen, said processing means including means responsive to scrolling of one of the lists for changing by whole numbers the frame of data displayed on the screen and being responsive to scrolling of the other list for changing by fractional numbers the frame of data displayed on the screen and correspondingly shifting the position of the displayed waveform data on the screen.

* * * * *